(12) United States Patent
Schultz

(10) Patent No.: US 9,662,785 B2
(45) Date of Patent: May 30, 2017

(54) GANTRY ROBOT SYSTEM

(71) Applicant: Jeffrey R. Schultz, Dayton, OH (US)

(72) Inventor: Jeffrey R. Schultz, Dayton, OH (US)

(73) Assignee: PRODUCTION DESIGN SERVICES, INC., West Carrollton, OH (US)

( * ) Notice: Subject to any disclaimer, the term of this patent is extended or adjusted under 35 U.S.C. 154(b) by 132 days.

(21) Appl. No.: 14/663,051

(22) Filed: Mar. 19, 2015

(65) Prior Publication Data
US 2016/0271791 A1    Sep. 22, 2016

(51) Int. Cl.
| | |
|---|---|
| *B25J 9/02* | (2006.01) |
| *B25J 15/00* | (2006.01) |
| *B25H 1/10* | (2006.01) |
| *B23K 37/02* | (2006.01) |
| *B25J 5/04* | (2006.01) |
| *B25J 9/04* | (2006.01) |
| *B23K 9/16* | (2006.01) |
| *B23K 9/28* | (2006.01) |
| *B23K 9/32* | (2006.01) |
| *H05H 1/00* | (2006.01) |

(52) U.S. Cl.
CPC ............. *B25J 9/026* (2013.01); *B23K 9/16* (2013.01); *B23K 9/28* (2013.01); *B23K 9/32* (2013.01); *B23K 37/0211* (2013.01); *B25J 5/04* (2013.01); *B25J 9/046* (2013.01); *H05H 1/00* (2013.01); *Y10S 901/02* (2013.01); *Y10T 29/53543* (2015.01)

(58) Field of Classification Search
CPC ......... B25J 9/026; B25J 15/0019; B25H 1/10; B23K 37/0211; B23K 37/025; Y10S 901/02; Y10T 29/53543
See application file for complete search history.

(56) References Cited

U.S. PATENT DOCUMENTS

| | | | |
|---|---|---|---|
| 4,633,055 A | 12/1986 | Conley | |
| 4,693,761 A * | 9/1987 | Bohm | B23K 7/10 |
| | | | 148/196 |
| 5,127,328 A * | 7/1992 | Wieland | B41F 27/1206 |
| | | | 101/415.1 |

FOREIGN PATENT DOCUMENTS

CN          103273490          9/2013

OTHER PUBLICATIONS

ABB Robotics, "IRB 6620LX Industrial robot on linear axis" (May 2010).
Macron Dynamics, Inc., "Gantry Systems: Working Outside the Envelope," http://www.macrodynamics.com/job-stories/gantry-systems-overview (Mar. 2015).

(Continued)

*Primary Examiner* — John C Hong
(74) *Attorney, Agent, or Firm* — Thompson Hine LLP

(57) ABSTRACT

A gantry robot system may include a workpiece support, a workpiece feeder for engaging the workpiece and moving the workpiece in a first direction relative to the workpiece support, a gantry, a slide movably mounted on the gantry and movable in a second direction different from the direction of movement of the workpiece by the workpiece feeder, an articulated arm mounted on the slide and having an end effector at an end of the articulated arm opposite the slide, and a computer control connected to actuate the workpiece feeder, the slide, the articulated arm, and the end effector in a coordinated manner to perform a preselected machining operation.

21 Claims, 4 Drawing Sheets

(56) References Cited

OTHER PUBLICATIONS

PDSI Robotic Welding Systems, P³ Positioning Solutions (first publication at least as early as Mar. 18, 2015).
Robotworx, "FANUC Gantry System Workcell" (first publication at least as early as Mar. 18, 2015).
Yaskawa Motoman Robotics, "HP20 Robot" (Sep. 2014).
Yaskawa Motoman Robotics, "MH24 Robot" (Jan. 2015).
Webpage featuring "Kawasaki Robotics" by EXPO21XX Online Exhibitions, http://www.expo21xx.com/automation21xx/14735_st3_robotics/default.htm (first publication at least as early as Feb. 2010).
Product Information featuring "KR16" by KUKA http://www.kuka-robotics.com/en/products/industrial_robots/low/kr16_2/start.htm (first publication at least as early as Dec. 2009).
Webpage featuring "Kuka KR16L8-3 Arc HW" by RobotWorx a Scott company, http://www.robots.com/kuka/kr-16-l8-3-arc-hw (first publication at least as early as Jul. 2013).
Product Information featuring "Arc Welding Robots" by Fanuc America Corporation, http://robot.fanucamerica.com/products/robots/arc-welding-robots.aspx (retrieved from the internet on Dec. 16, 2015, first publication at least as early as Jul. 2014).
Webpage featuring "IRB 2600ID—Industrial Robots—Robotics/ABB", http://new.abb.com/products/robotics/industrial-robots/irb-2600id (retrieved from the internet on Dec. 16, 2015, first publication at least as early as Jul. 2014).

\* cited by examiner

GANTRY ROBOT SYSTEM

TECHNICAL FIELD

This disclosure relates to robot systems, and more particularly, to robot systems in which a robot arm is mounted on a gantry to perform a machining operation.

BACKGROUND

Manufacturing operations increasingly are becoming automated. A significant factor in increasing such automation is the use of robots to perform repetitive tasks that require multiple, high-precision movements. Another factor favoring the use of robots is that a robot can perform a machining task in an environment, or using tools, that may be dangerous to humans. For example, a robot may be used to perform a machining operation that utilizes a plasma torch to cut metal such as steel. The use of a plasma torch generates extremely high temperatures, electric arcs, noxious gases, and a spray of molten metal.

There are several forms of robot devices that may be used to perform machining tasks. In one form, a machining tool, such as a plasma torch, an arc welder, or other device, may be mounted on an end of a machining tool that is moved by rails oriented at right angles to each other to move the machining tool in an X-Y direction, so that the machining operation follows a pattern in the form of Cartesian coordinates. An advantage of such a system is that it is relatively inexpensive, and can be repaired relatively quickly.

In another embodiment, a robot may take the form of a robotic arm. Such robotic arms are computer controlled and include articulated components, giving the robot arm relatively high flexibility movement in three dimensions. However, such robot arms are limited in reach to the collective length of the articulated arm segments. Such articulated robot arms may be mounted on a gantry so that the robot arm itself may be displaced along the gantry rail to provide added reach, or to perform a task in more than one workspace.

Accordingly, there is a need for a gantry robot system that provides maximum flexibility of positioning of the end effector of the robot arm in a minimal footprint.

SUMMARY

In one embodiment, a gantry robot system may include a workpiece support, a workpiece feeder for engaging a workpiece and moving the workpiece in a first direction relative to the workpiece support, a gantry, a slide movably mounted on the gantry and movable in a second direction different from the direction of movement of the workpiece by the workpiece feeder, an articulated arm mounted on the slide and having an end effector at an end of the articulated arm opposite the slide, and a computer control connected to actuate the workpiece feeder, the slide, the articulated arm, and the end effector in a coordinated manner to perform a preselected machining operation.

In another embodiment, a gantry robot system may include a workpiece support, a workpiece feeder for engaging a workpiece and moving the workpiece in a first direction relative to the workpiece support, the workpiece feeder having a powered roller and a guide roller mounted on the workpiece support, and a clamping roller for urging the workpiece against the powered roller and the guide roller, a gantry positioned above the workpiece support and the workpiece feeder, a slide moveably mounted on the gantry and moveable in a second direction different from the direction of movement of the workpiece by the workpiece feeder, a robot arm mounted on the slide, the robot arm having a swivel base rotatably mounted on the slide, a lower arm pivotally attached to the slide, an upper arm pivotally attached to the lower arm, an arm roll rotatably attached to the upper arm, a wrist bend rotatably attached to the arm roll, and a tool flange pivotally and rotatably attached to the arm roll, a plasma torch attached to the tool flange, and a computer control connected to actuate the clamping roller selectively to urge the workpiece sidewardly against the powered roller and the guide roller, and to release the workpiece from engagement with the powered roller and the guide roller, and to actuate the workpiece feeder, the slide, the robot arm, and the plasma torch in a coordinated manner to perform a preselected machining operation.

In yet another embodiment, a method for making a gantry robot system may include forming a workpiece support having a workpiece feeder for guiding a workpiece in a first direction relative to the workpiece support, positioning a gantry above the workpiece support and workpiece feeder, mounting a slide on an upper surface of the gantry for movement in a second direction substantially perpendicular to the first direction, mounting an articulated robot arm on an upper surface of the slide for rotational movement relative to the slide, attaching an end effector to the robot arm, and connecting a computer control to actuate the workpiece feeder, the slide, the robot arm, and the end effector.

Other objects and advantages of the disclosed robot gantry system will be apparent from the following description, the accompanying drawings, and the appended claims.

DETAILED DESCRIPTION

Figure 1:
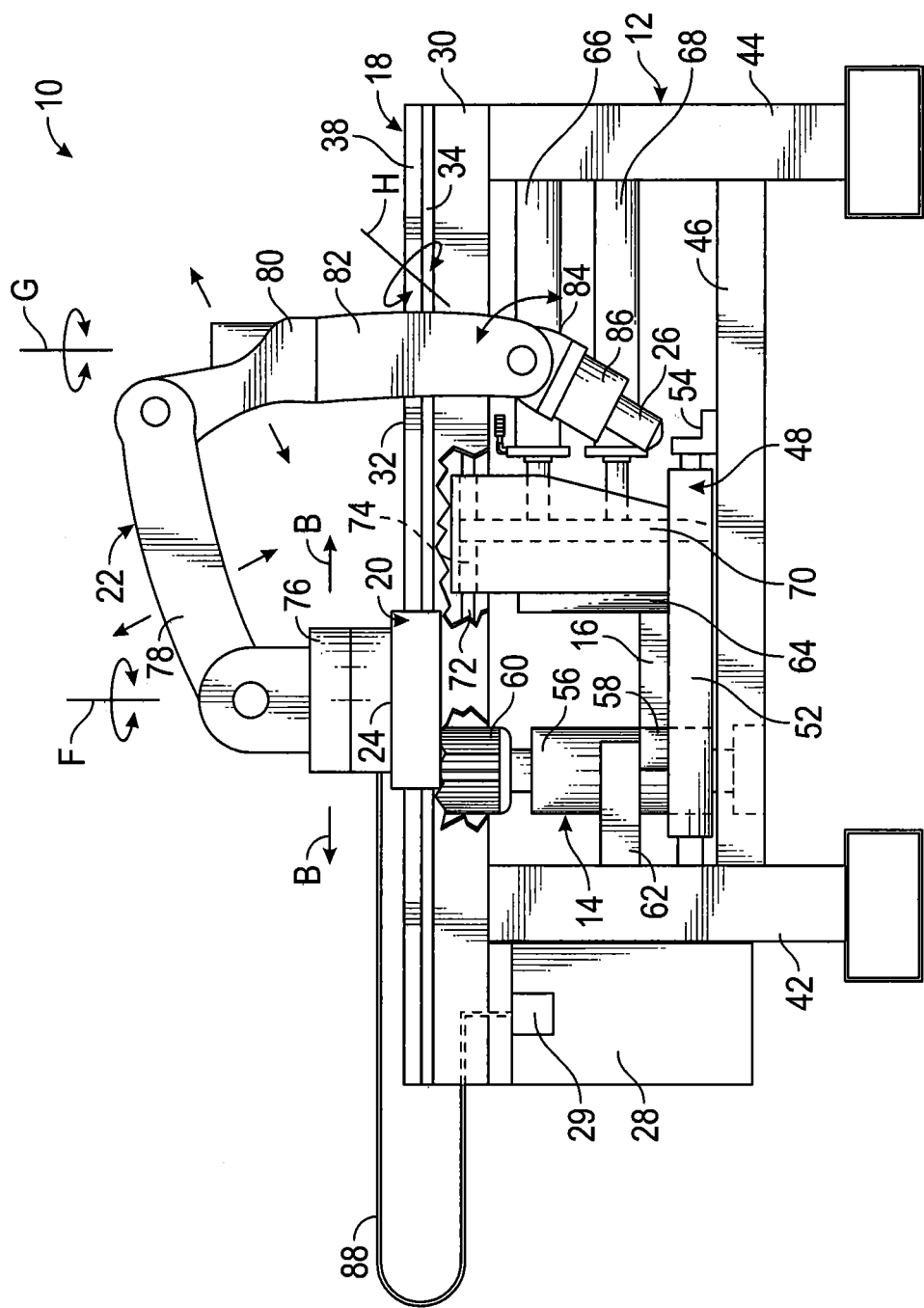
FIG. 1 is a somewhat schematic, front elevational view of the disclosed gantry robot system.

As shown in FIG. 1, the disclosed robot gantry system, generally designated 10, may include a workpiece support, generally designated 12, a workpiece feeder, generally designated 14, for engaging a workpiece 16, which may take the form of a flat plate, and for moving the workpiece in a first direction, indicated by arrow A (see FIG. 2) relative to the workpiece support. The system 10 may also include a gantry, generally designated 18, and a slide 20 moveably mounted on the gantry and moveable in a second direction, indicated by arrows B different from the direction of movement of the workpiece by the workpiece feeder 14.

An articulated arm, which in an embodiment may take the form of an articulated robot arm, generally designated 22, may be mounted on an upper surface 24 of the slide 20 and may have an end effector 26 at an end of the articulated arm opposite the slide 20. In robotics, an end effector is a device at the end of a robot arm designed to interact with the environment. The exact nature of the end effector depends on the application of the robot. The system 10 also may include a computer control 28 (see also FIG. 5), which in embodiments may include, or communicate with, or communicate with other components of the system 10 through, a programmable logic controller (PLC) component 29. The computer control 28 may be connected to actuate the workpiece feeder 14, the slide 20, the articulated arm 22 and the end effector 26 in a coordinated manner to perform a preselected machining operation.

In an embodiment, the end effector 26 may take the form of one of a plasma torch, an arc welder, an abrasive grinder, an adhesive applicator, a seal dispenser, a drill, and a stylus for marking or scribing, among other tools. Applicable plasma cutting systems may include Hypertherm HyDefinition Plasma Cutting Systems models HPR800XD, HPR400HD, HPR260XD, HPR130XD; Hypertherm Air and $O_2$ plasma cutting system models MaxPro 200 and HSD130; and Thermal-Dynamics high precision plasma cutting system model Ultra-Cut XT systems from 100-400 amps output.

Figure 2:
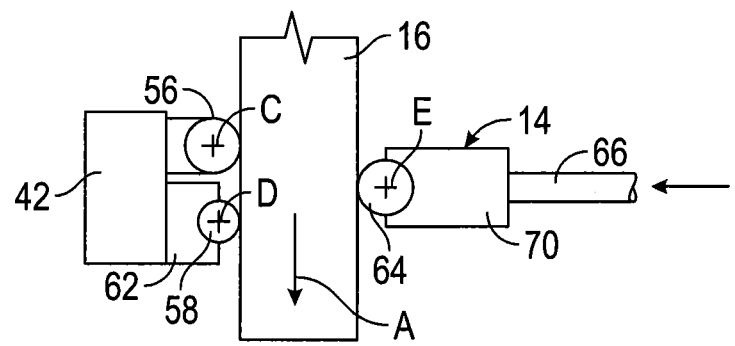
FIG. 2 is a detail of the gantry robot system of FIG. 1 showing the relative spatial orientation of the powered roller, the guide roller, and the clamping roller.

In an embodiment, the gantry 18 may be positioned above the workpiece support 12, and may include a linear rail 30. The slide 20 may be mounted on the rail 30 to slide along the top surface 32 of the rail. As shown in FIGS. 1 and 2, the slide 20 may include opposing, inwardly facing slots 34, 36 shaped to receive and engage opposing, longitudinal ribs 38, 40, respectively, extending outwardly from opposing vertical side walls forming the linear rail 30. In an embodiment, the slide 20 is supported on, and slides along, the ribs 38, 40 to provide clearance above the top surface 32 of the rail. The slide 20 may be moved in the direction of arrows B (FIG. 1) by a rack and pinion 41 internal to the rail 30 (FIG. 2). In an embodiment, the linear rail 30 may be oriented substantially perpendicular to the direction of travel of the workpiece 16 indicated by arrow A in FIG. 2. With such an orientation, the slide 20 may be moveable in the direction indicated by arrows B that is substantially perpendicular to the feed direction indicated by arrow A.

As shown in FIG. 1, the workpiece support 12 may include first and second upright supports 42, 44, a lower transverse brace 46 that extends between and is attached to the upright supports, and a roller support, generally designated 48, for the workpiece 16 that extends substantially horizontally. The linear rail 30 of the gantry 18 may be mounted on and supported by the first and second upright supports 42, 44, so that the linear rail adds stiffness to, and may form a structural component of, the workpiece support 12.

In an embodiment, the workpiece roller support 48 may include rollers 50, 52 (see FIG. 3) that may be rotatably mounted on the upright 42 at one end, and an L-bracket 54 the rotatably receives the rollers at an opposite end. The L-bracket 54 may be mounted on the lower transverse brace 46. The workpiece feeder 14 may include at least one powered roller 56 and a guide roller 58. The powered roller 56 may be rotatably mounted to the workpiece support 12, and in embodiments mounted on the first upright support 42. The powered roller 56 may be driven by a motor 60 that is mounted on the linear rail 30 of the gantry 18, and is powered and actuated by the computer control 28.

In embodiments, the motor 60 may take the form of a servo motor, such as an electric servo motor. As shown in FIG. 2, the powered roller 56 and the guide roller 58 may be aligned relative to each other to guide the workpiece 16 in the feed direction indicated by arrow A. In embodiments, the workpiece feeder 14 may include more than one powered roller (not shown). The guide roller 58 may be rotatably mounted on a bracket 62 that in turn is attached to the first upright support 42 of the workpiece support 14 (see FIG. 2).

In an embodiment, the workpiece feeder 14 of the gantry robot system 10 may include a clamping roller 64 for urging the workpiece 16 against the powered roller 56 and the guide roller 58 (see FIGS. 1 and 2). The computer control 28 may be configured to actuate the clamping roller 64 through the PLC component 29 selectively to urge the workpiece 16 sidewardly against the powered roller 56 and the guide roller 58 and conversely, to release the workpiece from engagement with the powered roller and the guide roller. The clamping roller 64 may be displaced by cylinders 66, 68, which may take the form of double-acting hydraulic cylinders or double-acting pneumatic cylinders, each of which may be actuated by the PLC component 29 of the computer control 28. As shown in FIG. 1, the cylinders 66, 68 may be oriented such that cylinder 66 is an upper cylinder and cylinder 68 is a lower cylinder. The attachment of the cylinders 66, 68 to the second upright support 44 may be a pivotable attachment, or may be fixed, as by bolting directly to the second upright support.

The workpiece feeder 14 may include a clamping roller retainer 70 that is slidably mounted on the linear rail 30 of the gantry 18. In an embodiment, the linear rail 30 may include parallel, opposing grooves 72, extending longitudinally and formed on opposing inner surfaces thereof, that may receive and retain parallel, opposing longitudinal ribs 74 protruding from an upper end of the clamping roller retainer 70. The clamping roller 64 may be rotatably mounted on the clamping roller retainer 70 and the cylinders 66, 68 attached to a side of the clamping roller retainer 70 opposite the clamping roller 64. Accordingly, when the cylinders 66, 68 are actuated by the computer control 28, the clamping roller retainer 70 may be displaced linearly along the linear rail 30 of the gantry 18 beneath the slide 20 toward and away from the workpiece 16, the powered roller 56, and the guide roller 58.

As shown in FIGS. 1 and 2, the powered roller 56, the guide roller 58, and the clamping roller 64 rotate about substantially vertical axes C, D, and E, respectively. The substantially vertical axes C, D, and E are substantially parallel to each other, and substantially perpendicular to the workpiece feed direction indicated by arrow A. As shown in FIG. 2, the rotational axis E of the clamping roller 64 is offset from (i.e., is not on a line perpendicular to arrow A with) the rotational axis C of the powered roller 56, and is offset from the rotational axis D of the guide roller 58. Consequently, the clamping roller 64 may urge the workpiece 16 sidewardly against both the powered roller 56 and the guide roller 58, thereby preventing the workpiece from skewing relative to the feed direction indicated by arrow A.

As shown in FIG. 1, the robot arm 22 may include a swivel base 76 rotatably mounted on the upper surface 24 of the slide 20 to rotate about a vertical axis F, a lower arm 78 pivotally attached to the swivel base, an upper arm 80 pivotally attached to the lower arm, and arm roll 82 rotatably attached to the upper arm to rotate about an axis G, and a wrist bend 84 rotatably attached to the arm roll to rotate about an axis H, and a tool flange 86 pivotally and rotatably attached to the arm roll. Accordingly, the robot arm 22, the slide 20, and the workpiece feeder 14 collectively provide at least eight degrees of freedom to the end effector 26. Examples of such a robot arm 22 include Yaskawa Motoman Model MH24, Model HP20, and Model HP20R; Kawasaki Model RS10L, and Model RS15X; Fanuc ArcMate Models 120iC and 120iC-10L; KUKA Models KR16 and KR16L8; and ABB Model IRB2600 ID. The described embodiment utilizes a Yaskawa Motoman MH24 robot, the specifications of which are set forth in Yaskawa technical specification sheet DS-601-A published January 2015, the entire contents of which are incorporated herein by reference.

The slide 20 may include an energy chain connector 88 that carries power cables and, if necessary, gas and/or air lines to the robot arm 22 and end effector 26. The energy chain 88 may be attached to the computer control 28 which may be connected to sources of power and various gases (not shown) for performing machining operations. An available energy chain 88 is E4 Series, fully enclosed, by igus Inc. of Cologne, Germany.

Figure 3:
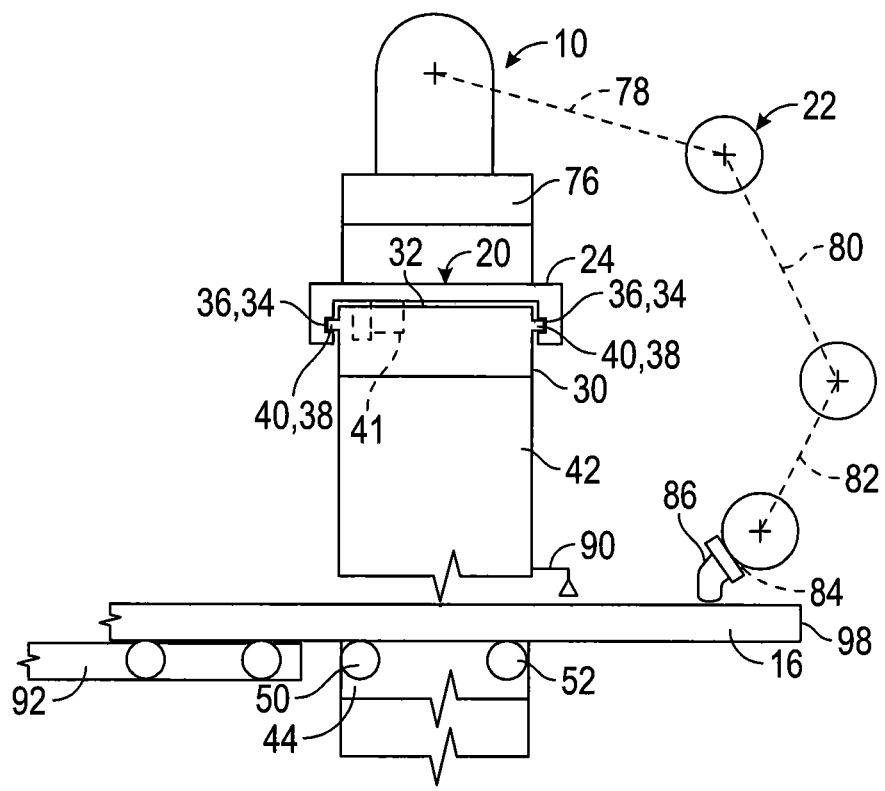
FIG. 3 is a schematic, side elevation showing a position of the robot arm and end effector relative to a workpiece passing beneath the gantry.
Figure 5:
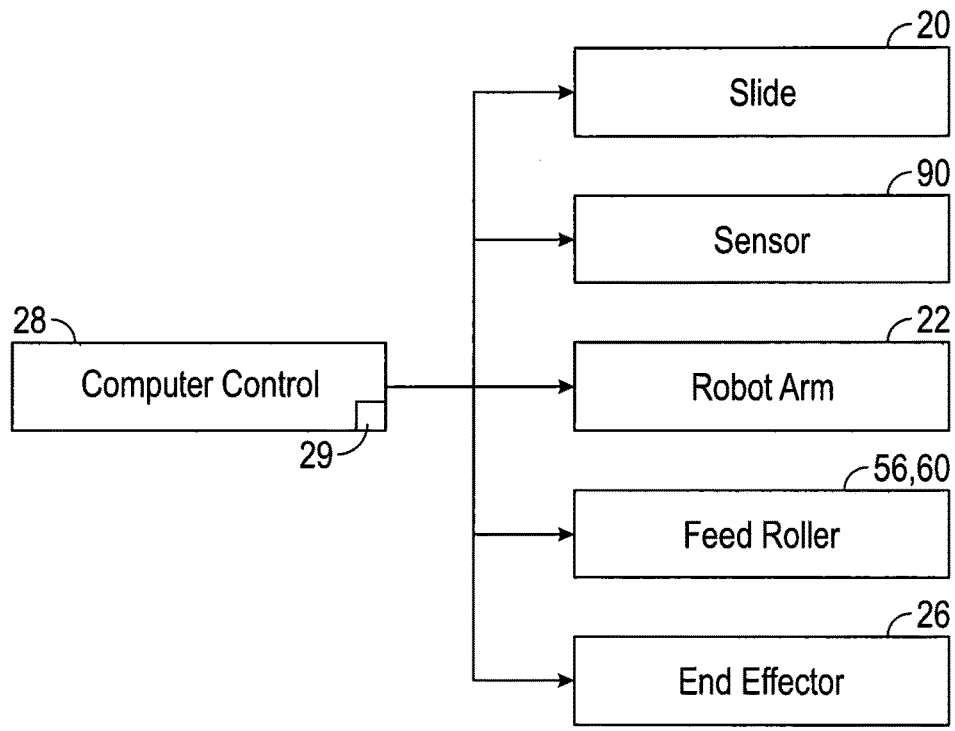
FIG. 5 is a schematic of the computer control system of the gantry robot system of FIG. 1.

As shown in FIG. 3, the system 10 may include a sensor 90 that may be mounted on an upright 42 (FIG. 1) and connected to the PLC component 29 of the computer control (see FIG. 5). The sensor 90 may be positioned to detect the position of the workpiece 16 as it leaves a feed conveyor, generally designated 92, upstream of the gantry robot system 10, and passes beneath the gantry 18 to a position where the predetermined machining operation is to occur. The sensor 90 also detects when the trailing edge leaves the workpiece roller support 48 of the system 10, so that the PLC component 29 may signal to the computer control 28 that the workpiece 16 is clear and to deactivate the predetermined machining process.

As shown in FIGS. 1 and 3, the robot arm 22 may be manipulated by the computer control 28 to perform a machining operation on the workpiece 16 at a variety of locations on the workpiece. The improved flexibility of the system 10 is shown best in FIG. 4. By displacing the slide 20 along the upper surface 32 of the linear rail 30 of the gantry 18, the robot arm 22 may be positioned to perform machining operations on an underside of the workpiece 16 without having to move the workpiece itself from its position shown in FIG. 1. Consequently, the workpiece 16 may remain stationary, or in applications will not have to be rotated or tilted about a longitudinal axis, or elevated or declined from a substantially horizontal orientation, while the robot arm 22 is displaced by the computer control 28 along the rail 30 to enable the end effector 26 to perform machining operations even on an underside or bottom surface 92 of the workpiece 16 without moving the workpiece from its position in which the robot arm positions the end effector to perform machining operations on the upper or top surface 94 of the workpiece.

Figure 4:
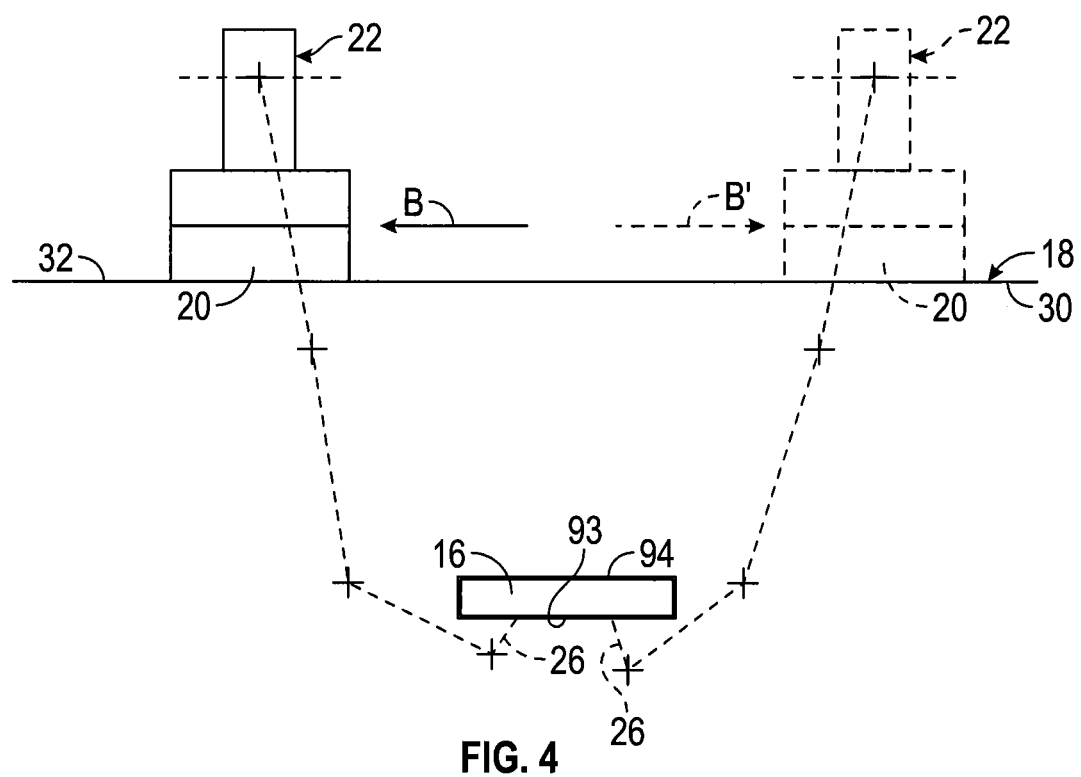
FIG. 4 is a schematic front elevational view of the gantry robot system of FIG. 1, showing movement of the slide relative to the gantry and different positions of the robot arm.

For example, by moving the slide 20 in the direction of arrow B in FIG. 4, the robot arm 22 may be manipulated by the computer control 28 to reach an underside 93 of the workpiece 16; that is, to the left of the workpiece as shown in FIG. 4. Conversely, by movement of the slide 20 in the direction of arrow B', the robot arm 22 may be positioned to reach an underside surface 93 of the workpiece 16 with the end effector 26 that is to the right of the workpiece, all without moving the spatial location of the workpiece 16 to perform either operation. Although gantry robots of this type typically may be used for overhead work processes, the disclosed gantry robot system 10 may be sufficiently flexible to perform machining operations on an underside surface 93 of a workpiece 16, without having to move the workpiece spatially relative to the system 10.

Figure 6:
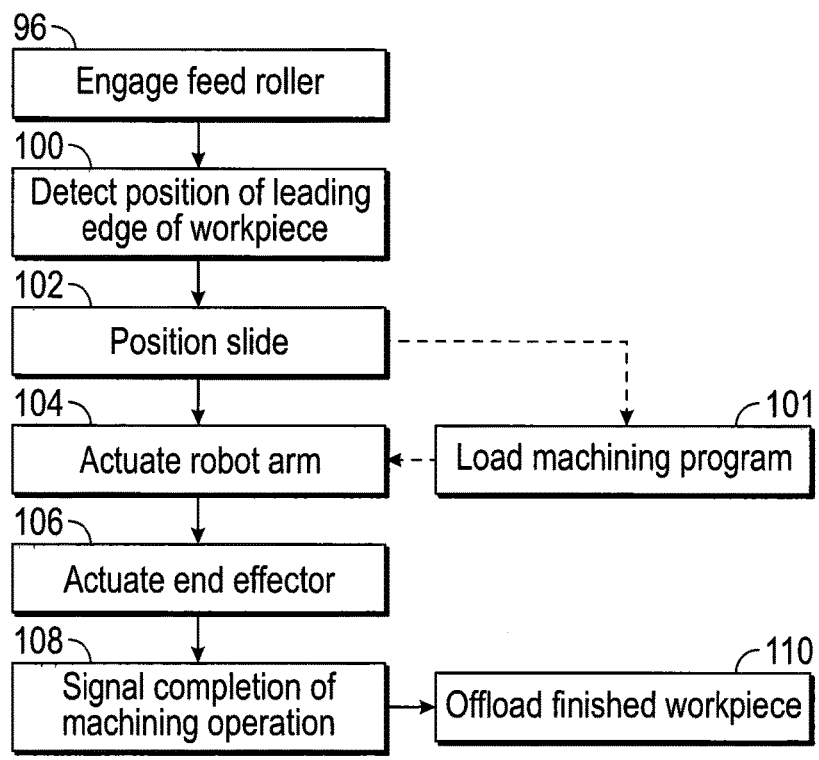
FIG. 6 is a flow chart of the operation of the computer control of the gantry robot system of FIG. 1.

The operation of the gantry robot system 10 is described schematically in FIG. 6. As shown in block 96, the workpiece 16, which may take the form of a flat plate of metal such as steel, may be offloaded from a feed conveyor 92 (see FIG. 3) until the plate engages the powered feed roller 56 (FIG. 1) and guide roller 58. The cylinders 66, 68 may be actuated by the computer control 28 to urge the clamping roller 64 against the feed roller 56 and guide roller 58, as shown in FIG. 1. The feed roller 56 then may be actuated by the computer control 28 to feed the workpiece 16 in the feed direction indicated by arrow A (see FIG. 2) until the leading edge 98 (see FIG. 3) of the workpiece is detected by the sensor 90, as indicated by block 100.

The computer control 28 may be programmed to perform a machining operation and may employ known software, such as StruCim, to create a cutting program from a supplied CAD file having the predetermined machining operation. As indicated at block 101, a set of commands for a preselected machining operation may be loaded into the computer control 28. Although shown between blocks 102 and 104 in FIG. 6, the step of block 101 may be performed prior to engaging the feed roller in block 96, or prior to detecting the position of the leading edge of the workpiece of block 100, or at another appropriate time in the sequence of steps of FIG. 6. Indeed, the program of block 101 may be pre-loaded in the computer control 28 prior to the system 10 receiving workpiece 16.

Next, the slide 20 may be positioned along the linear rail 30 in a position shown in FIG. 1 or 4, or a position intermediate or different from the position shown in those figures for best positioning of the robot arm 22, as indicated in block 102. The robot arm 22 may then be actuated by the computer control 28, as indicated in block 104, to position the end effector 26 to perform the machining operation, which in an embodiment may include cutting with a plasma torch. As indicated in block 106, when the articulated arm 22 is positioned appropriately, then as indicated in block 106 the end effector 26 is actuated to perform the machining operation.

The machining operation, which may be directed by commands from the program instructions loaded into the computer control 28, may cause the slide 20 to move along the linear rail 30, the robot arm 22 to swivel on the slide, and the arm to position the end effector 26 at a location, or at a series of locations on the workpiece 16, or to perform a machining operation, or a continuous machining operation, such as a continuous cut or series of cuts, on the workpiece. The commands loaded into the computer control 28 in block 101 also may cause the feed roller 56 of the workpiece feeder 14 to rotate alternately in a forward and a reverse direction, and/or a series of combinations of forward and reverse directions, and/or a series of forward directions, each of which may be of a different distance, simultaneously with movement of the robot arm 22, and/or slide 20, and/or end effector 26, to position the workpiece 16 at a predetermined location for the machining operation or operations. Thus, the computer control 28 actuates the feed roller 56 and workpiece feeder 14, the gantry 18 and slide 20, the robot arm 22, and the end effector 26 to act together in a coordinated manner to perform a preselected machining operation on a workpiece 16.

The computer control may indicate the completion of the machining operation, as indicated in block 108, by an indicator light (not shown) and/or a tone or chime, whereupon the machined workpiece 16 may be offloaded, for example, by placing it on a downstream conveyor (not shown) adjacent the gantry robot system 10, indicated at block 110.

This disclosure also encompasses a method for making the gantry robot system 10. The method may include forming the workpiece support 12 having the workpiece feeder 14 for guiding the workpiece 16 a first direction relative to the workpiece support. The gantry 18 may be positioned above, and in embodiments mounted on, the workpiece support 12. The slide 20 may be mounted on the gantry 18 for movement along the top surface 32 thereof in a second direction substantially perpendicular to the first direction of the workpiece 16. An articulated robot arm 22 is mounted on the upper surface 24 of the slide 20 for rotational movement relative to the slide. The end effector 26 may be attached to the robot arm. And, a computer control 28 may be connected to actuate the workpiece feeder 14, the slide 20, the robot arm 22, and the end effector 26.

While the forms of apparatus and methods described herein constitute preferred embodiments of the disclosed gantry robot system, it is to be understood that modifications may be made therein without departing from the scope of the invention.

What is claimed is:

1. A gantry robot system, comprising:
   a workpiece support;
   a workpiece feeder for engaging a workpiece and having a powered roller for moving the workpiece in a first direction relative to the workpiece support, a clamping roller for urging the workpiece against the powered roller, and a clamping roller retainer;
   a gantry having a linear rail above the workpiece feeder, the clamping roller retainer slidably mounted on the linear rail;
   a slide movably mounted on the linear rail to slide along a top surface of the linear rail and movable in a second direction different from the direction of movement of the workpiece by the workpiece feeder;
   an articulated arm mounted on the slide and having an end effector at an end of the articulated arm opposite the slide; and
   a computer control connected to actuate the workpiece feeder, the slide, the articulated arm, and the end effector in a coordinated manner to perform a preselected machining operation.

2. The system of claim 1, wherein the end effector is selected from a plasma torch, an arc welder, an abrasive grinder, an adhesive applicator, a seal dispenser, a drill, and a stylus for marking or scribing.

3. The system of claim 1, wherein the articulated arm is an articulated robotic arm controlled by the computer control.

4. The system of claim 3, wherein the articulated arm includes a swivel base rotatably mounted on an upper surface of the slide, a lower arm pivotally attached to the swivel base, an upper arm pivotally attached to the lower arm, an arm roll rotatably attached to the upper arm, and a wrist bend rotatably attached to the arm roll, and a tool flange pivotally and rotatably attached to the arm roll.

5. The system of claim 1, wherein the articulated arm, the slide, and the workpiece feeder collectively provide at least eight degrees of freedom to the end effector.

6. The system of claim 1, wherein the gantry is positioned above the workpiece support.

7. The system of claim 1, wherein the linear rail is oriented substantially perpendicular to the first direction in a substantially horizontal plane; whereby the slide is movable in the second direction substantially perpendicular to the first direction.

8. The system of claim 1, wherein the workpiece support includes first and second upright supports; a lower transverse brace; and a roller support extending substantially horizontally.

9. The system of claim 1, wherein the workpiece feeder includes a guide roller; and wherein the computer control actuates the powered roller.

10. The system of claim 9, wherein the powered roller and the guide roller are aligned with each other to guide the workpiece in the first direction.

11. The system of claim 10, wherein the computer control actuates the clamping roller selectively to urge the workpiece sidewardly against the powered roller and the guide roller, and to release the workpiece from engagement with the powered roller and the guide roller.

12. The system of claim 11, wherein the clamping roller is displaced by at least one double-acting cylinder; and wherein the at least one double-acting cylinder is actuated by the computer control.

13. The system of claim 12, wherein the at least one double-acting cylinder includes an upper cylinder and a lower cylinder.

14. The system of claim 13, wherein the clamping roller is rotatably mounted on the clamping roller retainer.

15. The system of claim 14, wherein the at least one double-acting cylinder is actuated by the computer control to displace the clamping roller retainer along the linear rail toward and away from the workpiece, the powered roller, and the guide roller.

16. The system of claim 15, wherein the powered roller, the guide roller, and the clamping roller rotate about substantially vertical axes, and the substantially vertical axes are substantially parallel to each other.

17. The system of claim 11, wherein a rotational axis of the clamping roller is offset from a rotational axis of the powered roller and a rotational axis of the guide roller, such that the clamping roller urges the workpiece sidewardly against the powered roller and the guide roller, thereby preventing the workpiece from skewing relative to the first direction.

18. A gantry robot system, comprising:
   a workpiece support;
   a workpiece feeder for engaging a workpiece and moving the workpiece in a first direction relative to the workpiece support, the workpiece feeder having a powered roller and a guide roller mounted on the workpiece support, a clamping roller for urging the workpiece against the powered roller and the guide roller, and a clamping roller retainer;
   a gantry having a linear rail positioned above the workpiece support and the workpiece feeder, the clamping roller retainer slidably mounted on the linear rail;
   a slide movably mounted on the linear rail and movable along a top surface thereof above the clamping roller retainer in a second direction different from the direction of movement of the workpiece by the workpiece feeder;
   a robot arm mounted on an upper surface of the slide, the robot arm having a swivel base rotatably mounted on the slide, a lower arm pivotally attached to the slide, an upper arm pivotally attached to the lower arm, an arm roll rotatably attached to the upper arm, a wrist bend rotatably attached to the arm roll, and a tool flange pivotally and rotatably attached to the arm roll;
   a plasma torch attached to the tool flange; and
   a computer control connected to actuate the clamping roller selectively to urge the workpiece sidewardly against the powered roller and the guide roller, and to release the workpiece from engagement with the powered roller and the guide roller, and to actuate the workpiece feeder, the slide, the robot arm, and the plasma torch in a coordinated manner to perform a preselected machining operation.

19. A method for making a gantry robot system, the method comprising:
   forming a workpiece support having a workpiece feeder for guiding a workpiece in a first direction relative to the workpiece support;
   providing the workpiece support with a powered roller for moving the workpiece in a first direction relative to the workpiece support, a clamping roller for urging the workpiece against the powered roller, and a clamping roller retainer;
   positioning a linear rail of a gantry above the workpiece support and workpiece feeder;
   mounting the clamping roller retainer slidably on the linear rail
   mounting a slide on the linear rail above the clamping roller retainer for movement along a top surface thereof in a second direction substantially perpendicular to the first direction;
   mounting an articulated robot arm on an upper surface of the slide for rotational movement relative to the slide;
   attaching an end effector to the robot arm; and
   connecting a computer control to actuate the workpiece feeder, the slide, the robot arm, and the end effector.

20. The method of claim 19, further comprising programming the computer control to actuate the workpiece feeder, the slide, the robot arm, and the end effector in a coordinated manner to perform a preselected machining operation.

21. The method of claim 19, wherein connecting the computer control includes connecting the computer control to actuate the robot arm to reach an underside of the workpiece as it protrudes from the workpiece support.

* * * * *